United States Patent [19]

Miller et al.

[11] Patent Number: 6,052,682
[45] Date of Patent: Apr. 18, 2000

[54] METHOD OF AND APPARATUS FOR RECOGNIZING AND LABELING INSTANCES OF NAME CLASSES IN TEXTUAL ENVIRONMENTS

[75] Inventors: Scott Miller, Cambridge, Mass.; Daniel M. Bikel, Wilton, Conn.; Richard M. Schwartz, Sudbury, Mass.

[73] Assignee: BBN Corporation, Cambridge, Mass.

[21] Appl. No.: 08/848,972

[22] Filed: May 2, 1997

[51] Int. Cl.$^7$ ...................................................... G06F 17/30
[52] U.S. Cl. ........................... 707/3; 707/4; 707/5; 707/6
[58] Field of Search .................................. 707/1, 3, 4, 5, 707/6

[56] References Cited

U.S. PATENT DOCUMENTS

| | | | |
|---|---|---|---|
| 5,510,981 | 4/1996 | Berger et al. | 704/2 |
| 5,524,240 | 6/1996 | Barbara et al. | 707/3 |
| 5,621,859 | 4/1997 | Schwartz | 704/256 |
| 5,649,023 | 7/1997 | Barbara et al. | 382/159 |
| 5,682,501 | 10/1997 | Sharman | 704/260 |
| 5,710,916 | 1/1998 | Barbara et al. | 707/9 |

OTHER PUBLICATIONS

Pieraccini et al., "Progress Report on the Chronus System: ATIS Benchmark Results," *Proceedings of the Speech and Natural Language Workshop*, Harriman, NY, Published by Morgan Kaufmann, Feb. 1992 pp. 67–71.

Pieraccini et al., "Stochastic Representation Of Conceptual Structure In The ATIS Task," *Proceedings of the Speech and Natural Language Workshop*. Pacific Grove, California, Published by Morgan Kaufmann 1991 pp. 121–124.

*Primary Examiner*—Paul R. Lintz
*Assistant Examiner*—Cheryl Lewis
*Attorney, Agent, or Firm*—Leonard Charles Suchyta; Floyd E. Anderson

[57] ABSTRACT

A computer assisted method for recognizing and labeling instances of name classes in textual environments is described. The invention receives training text having instances of named-entity classes labeled, from which it generates a database of bigram and unigram occurrences. The invention uses the database of bigram and unigram occurrences to form a two level Hidden Markov Model with single output states at the lower level. The invention also receives a series of input text to be processed and labeled with respect to the name classes, and the invention uses the two level Hidden Markov Model to recognize and label instances of named-entity classes in the input text.

16 Claims, 5 Drawing Sheets

| Word Feature | Example Text | Intuition |
|---|---|---|
| twoDigitNum | 90 | Two-digit year |
| fourDigitNum | 1990 | Four digit year |
| containsDigitAndAlpha | A8956-67 | Product code |
| containsDigitAndDash | 09-96 | Date |
| containsDigitAndSlash | 11/9/89 | Date |
| containsDigitAndComma | 23,000.00 | Monetary amount |
| containsDigitAndPeriod | 1.00 | Monetary amount, percentage |
| otherNum | 456789 | Other number |
| allCaps | BBN | Organization |
| capPeriod | M. | Person name initial |
| firstWord | *first word of sentence* | No useful capitalization information |
| initCap | Sally | Capitalized word |
| lowerCase | can | Uncapitalized word |
| other | | Punctuation marks, all other words |

| Name-class Bigrams | First-word Bigrams | Non-first-word Bigrams |
|---|---|---|
| $\Pr(NC \mid NC_{-1}, w_{-1})$ | $\Pr(\langle w,f \rangle_{first} \mid NC, NC_{-1})$ | $\Pr(\langle w,f \rangle \mid \langle w,f \rangle_{-1}, NC)$ |
| $\vdots$ | $\vdots$ | $\vdots$ |
| $\Pr(NC \mid NC_{-1})$ | $\Pr(\langle w,f \rangle \mid \langle \text{+begin+}, \text{other} \rangle, NC)$ | $\Pr(\langle w,f \rangle \mid NC)$ |
| $\vdots$ | $\vdots$ | $\vdots$ |
| $\Pr(NC)$ | $\Pr(\langle w,f \rangle \mid NC)$ | $\Pr(w \mid NC) \cdot \Pr(f \mid NC)$ |
| $\vdots$ | $\vdots$ | $\vdots$ |
| $\dfrac{1}{\text{number of name-classes}}$ | $\Pr(w \mid NC) \cdot \Pr(f \mid NC)$ | $\dfrac{1}{\lvert V \rvert} \cdot \dfrac{1}{\text{number of word features}}$ |
| | $\vdots$ | |
| | $\dfrac{1}{\lvert V \rvert} \cdot \dfrac{1}{\text{number of word features}}$ | |

FIGURE 5

METHOD OF AND APPARATUS FOR RECOGNIZING AND LABELING INSTANCES OF NAME CLASSES IN TEXTUAL ENVIRONMENTS

FIELD OF THE INVENTION

The present invention relates generally to word recognition and more particularly to recognition of name classes in textual environments using trainable statistical models.

BACKGROUND OF THE INVENTION

In general, Named-Entity Recognition Systems (hereinafter referred to as NERSs) are used to identify and label particular classes of names in textual information. Examples of such name classes are organization names, person names, location names, dates, times, monetary amounts, and percentages. One application for a NERS is the generation of a searchable database. For example, suppose a newspaper sets out to create a searchable database of all of its stories ever published. In order to be able to search for stories containing information about particular organizations, people, locations, etc., each story within the database must be categorized with respect to the name classes contained therein. Once categorized, stories which contain desired organizations, people, locations, etc. can be easily retrieved. The need to identify names in text also extends to other media such as magazines, radio, wire services, etc.

Difficulties in identifying and classifying names arise because of naturally occurring ambiguity between name classes. The following pairs of sentences illustrate the problems caused by name class ambiguity:

1a. Anne Dakota reported earnings of twenty three cents a share.
1b. Anne Dakota reported for work as usual on Monday morning.
2a. April is usually a moody person, but not this week.
2b. April is usually a rainy month, but not this year. A human reader can discern from the context that the subject of sentence (1a) is an organization, while in sentence (1b), the subject is a person. Similarly, a human reader can discern from the context that in sentence (2a), "April" is a person, and in sentence (2b), "April" is a month of the calendar year. Thus, we see in these two examples ambiguity between organization names and person names, and between person names and dates. Such ambiguity is widespread among these name classes, and similar ambiguities occur among most other name classes of interest. Name class ambiguity presents an especially difficult challenge when labeling unknown words. For example:
3. Barney Smith said that Phil Jones is leaving the firm to pursue other interests. In this example, it is impossible to determine with certainty whether "Barney Smith" is the name of an organization or a person, unless the name happens to be known in advance. In such cases, a NERS must make a determination based on incomplete and uncertain information.

Many prior art methods of recognizing names in text incorporate large and complex sets of rules. For example, to determine the correct class for "Anne Dakota" in sentence (1a), a name finding system might contain the following rule:

Rule—when a subject reporting earnings could be either a person or an organization, always assume the subject is an organization.

Such rules are typically generated manually, a process which is time consuming and iterative. Highly expert rule writers are required to design an effective system, and a rule based system is difficult to maintain and update. Furthermore, the rule development process must be repeated for all new name classes, as well as for each new language of interest. For example, finding names in Spanish text requires an entirely different set of rules than those used for English.

Hidden Markov Models (hereinafter referred to as HMMs) have been widely used in the prior art in speech recognition applications. HMMs have also been successfully applied to part-of-speech recognition and labeling (for example, see Church, 1988). In general, an HMM defines a system having a finite number of states, with each state capable of emitting a number of information symbols. For each state in the HMM, there exists some probability of a transition from any other state in the HMM, including self-looping transitions. Consequently, if there are N states in the HMM, there must exist $N^2$ transition probabilities.

By making a Markov independence assumption regarding the state transitions of the system, each transition probability may be conditioned on only the previous state. The $N^2$ transitional probabilities may then be represented as a matrix, with each element of the matrix being written as $$a_{ij}=Pr(q_t=S_j|q_{t-1}=S_i), \tag{1}$$

where $q_t$ represents the state of the system at time=t, $q_{t-1}$ represents the state of the system at time=(t-1), $S_j$ represents the $j^{th}$ state of the system, $S_i$ represents the $i^{th}$ state of the system, and $a_{ij}$ is the probability of a system state transition to the $S_j^{th}$ state at time=t, given that the previous state of the system at time=(t-1) was $S_i$. Each of the transitional probabilities have the following properties:

$$a_{ij} \geq 0 \tag{2}$$

$$\sum_{j=1}^{N} a_{ij} = 1. \tag{3}$$

A discrete HMM is defined by the following quintuple:
HMM=(S, Σ, A, B, π), where
 S is the set of states, |S|=N,
 Σ is the set of discrete output symbols, |Σ|=M,
 A is the state transition probability matrix, where
  $a_{ij}$=Pr($q_t$=$S_j$ |$q_{t-1}$=$S_j$), $1 \leq i,j \leq N$
 B is the observation symbol probability distribution in state $S_j$, where
  $b_j(k)$=Pr($\sigma_k \in \Sigma$ at time t |$q_t$=$S_j$) $1 \leq j \leq N$ $1 \leq k \leq M$ and,
 π is the initial state probability distribution vector, where each element of π is given by
  $\pi_j$=Pr($q_1$=$S_j$), for all j from 1 to N.
The HMM provides a probability distribution over the entire output symbol alphabet for every state, i.e., each state has some probability of producing any symbol from the alphabet.

The following example illustrates an application of an HMM. Suppose in a library there are a thousand books written by a hundred different authors. Now suppose an adversary randomly chooses a book from the library and discloses the number of pages in that book. The adversary then proceeds to select a series of books via a random process, where each selection is conditioned upon the author of the previous book, and discloses the number of pages in each book. Given only the resulting series of page count observations, our goal is to produce the most likely sequence of authors. An HMM can model this output with one state per author, where, at each state, there is some probability for generating a book of any number of pages. Given the first page count observation, the HMM uses π to make a transition to any state with some probability, thereafter using the transition probability matrix A to determine the rest of the sequence of state transitions, while using B to generate an observation at each state.

OBJECTS OF THE INVENTION

It is a general object of the present invention to provide a method and apparatus for recognizing and labeling names in text that significantly overcomes the problems of the prior art.

A more specific object of the present invention is to provide a method and apparatus for recognizing and labeling names in text which does not require a large and complex set of rules written by experts.

A further object of the present invention is to provide a method and apparatus for recognizing and labeling names in text which can be updated for new name classes and new languages without re-developing the rule set.

Yet another object of the present invention is to implement a method and apparatus for recognizing and labeling names in text with a multiple level Hidden Markov Model.

SUMMARY OF THE INVENTION

Accordingly, the present invention is directed to a computer-assisted method and apparatus for recognizing and labeling instances of name classes in textual environments. In accordance with one aspect of the present invention, a NERS comprises a mutilevel HMM including an upper level representing a class of named entities and a lower level representing words generated by the upper level state. In accordance with yet another aspect of the invention a NERS comprises a multilevel HMM including at least one upper level, including a plurality of states (e.g., name classes), and at least one lower level including a plurality of states (e.g., word-states), wherein at least one of the transitions between the upper states is conditioned on the output of the previous lower state, and at least one of the transitions between the lower state is conditioned on the output of the previous upper state.

In accordance with a third aspect of the invention, a marked string of words is provided and used to estimate a plurality of HMM parameters. The plurality of HMM parameters are used to generate an HMM with N upper level states, each of the N states representing a name class and having a plurality of member states. In accordance with one aspect of the invention, an unmarked string of K words is provided. An embodiment of the invention recognizes and labels a plurality of name class instances in the unmarked string of K words by evaluating a $k^{th}$ and a $(k+1)^{th}$ word from the unmarked string of K words. From the HMM parameters, a transition probability is determined, wherein the transition probability represents a likelihood of the $(k+1)^{th}$ word being a member of an $i^{th}$ state, given the $k^{th}$ word being a member of a $j^{th}$ state, and given the $(k+1)^{th}$ word immediately following the $k^{th}$ word, where the $i^{th}$ state and the $k^{th}$ state are member states of the N name class states. The transition probability evaluation is repeated for all i from 1 to N and for all j from 1 to N, whereby $N^2$ transition probabilities are determined. The highest transition probability is retained to the $(k+1)^{th}$ word in each of the N states, whereby N transition probabilities are retained. The invention repeats the $N^2$ probability evaluations and N probability retentions for each $k^{th}$ $(k+1)^{th}$ word pairs, for all k from 1 to K, whereby N·(K−b 1) transition probabilities are retained. The invention then identifies the highest probability path from the $K^{th}$ word back to the first word, and labels each of the K words with the name class state through which the highest probability path from the N identified paths passes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE DRAWINGS

Figure 1:
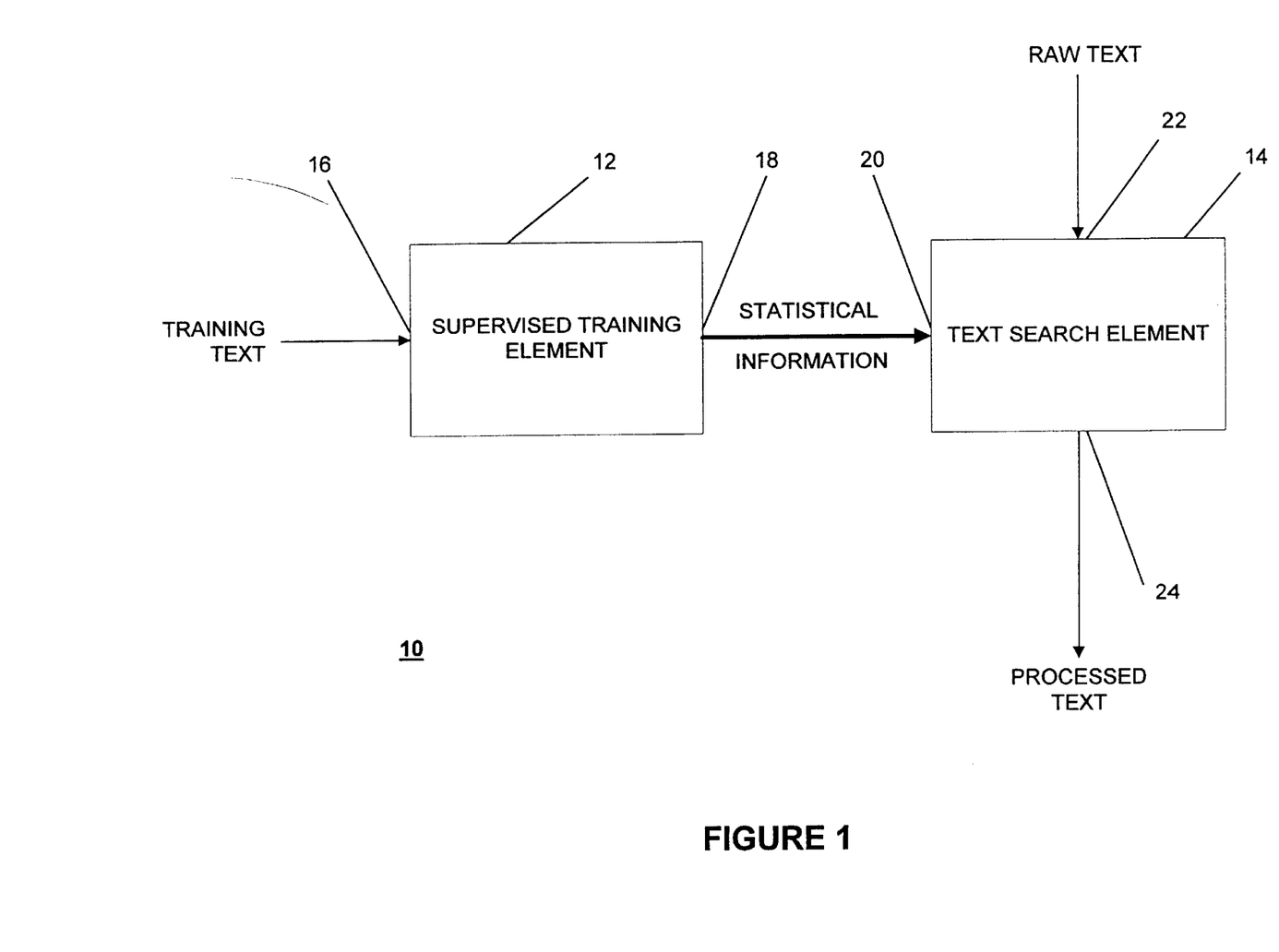
FIG. 1 shows a block diagram of a name entity recognition system.

FIG. 1 shows a block diagram of a named-entity recognition system 10, constructed in accordance with the present invention. The system 10 can be implemented on a computerized system such as the SPARC 5 workstation commercially available from Sun Microsystems, Inc., of Mtn. View Calif., 94043, USA. The system 10 includes a supervised training element 12 and a text search element 14. The supervised training element 12 receives training text at a training input port 16 and produces HMM parameters, including statistical information, at a parameter output port 18. The training text includes a series of words which have each instance of a named-entity class (hereinafter referred to as NC) labeled. Details regarding the characteristics of the training text and how the supervised training element 12 uses the training text to generate the statistical information are provided later in this description. In general, the statistical information which the supervised training element 12 produces at a parameter output port 18 describes the probability that a particular word pair will occur in text, given that each of the words is associated with a particular NC. The probability is also conditioned on various attributes of each of the words, such as capitalization, number of digits, and location in the sentence structure.

The text search element 14 receives the statistical information from the supervised training element 12 at parameter input port 20. The text search element 14 also receives a series of input text to be processed and labeled with respect to the NCs at raw text input port 22. The text search element 14 uses the statistical information it receives at the parameter input port 20 as parameters to a Hidden Markov Model (hereinafter referred to as HMM). The text search element 14 uses the HMM to recognize and label instances of the NCs within the raw text. The details regarding how the HMM applies the statistical information and how the text search element 14 uses the HMM to recognize and label instances of NCs are provided later in this description.

Figure 2:
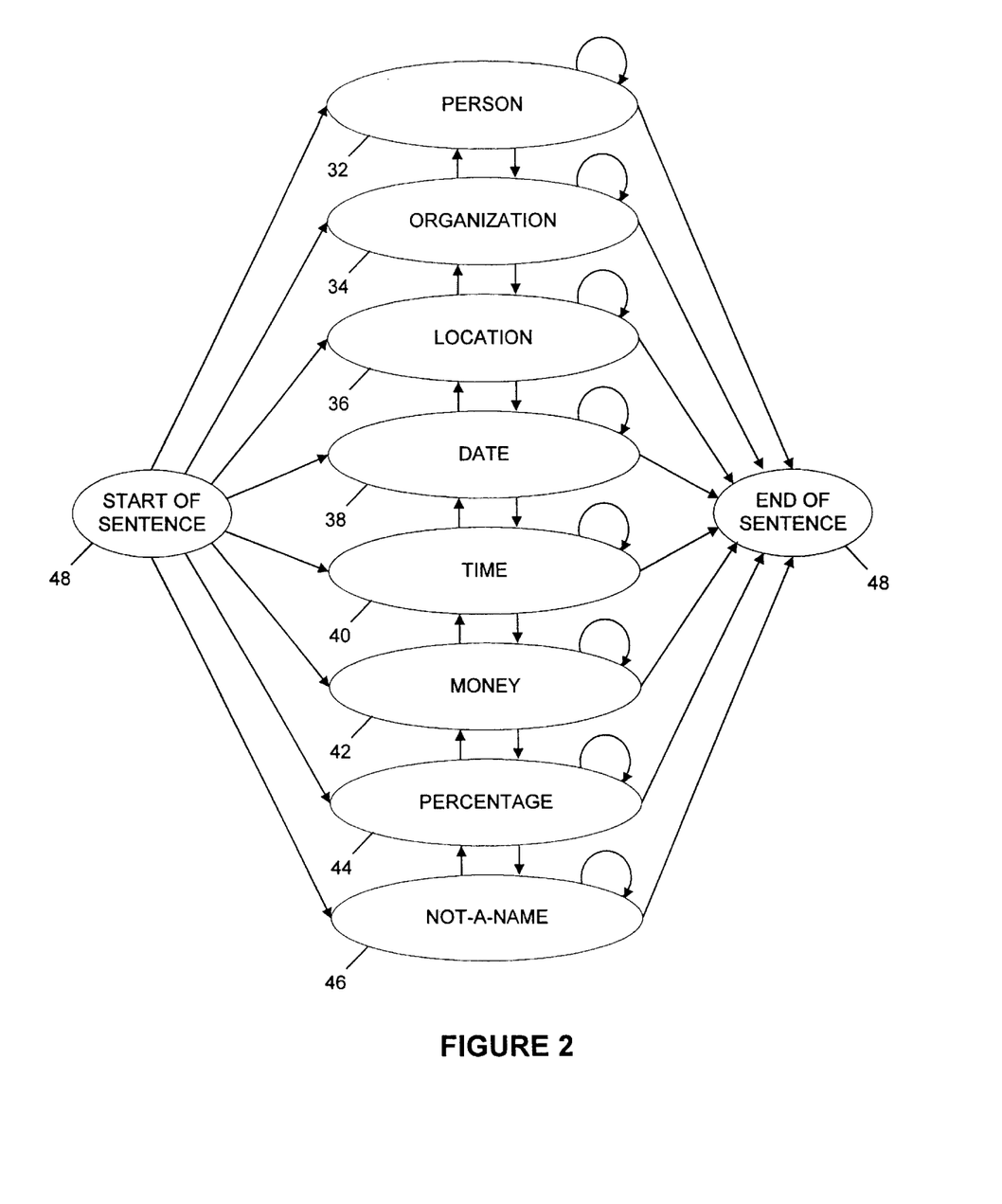
FIG. 2 shows a block diagram of the first, upper level of a two level HMM.

In one embodiment, the present invention utilizes a two level HMM in the text search element 14, although those skilled in the art will recognize that multiple levels could be incorporated in the HMM. FIG. 2 shows a block diagram of the first, upper level of a two level HMM. The upper level of the two level HMM includes a total of ten states, including eight NC states and two special states. The eight NC states include the Person 32 state, the Organization 34 state, the Location 36 state, the Date 38 state, the Time 40 state, the Money 42 state, the Percentage 44 state and the Not-a-Name 46 state. The two special states include a Start-of-Sentence 48 state and an End-of-Sentence 50 state.

The second, lower level of the HMM consists of eight statistical bigram language models, one corresponding to each of the eight NC states. Each statistical bigram language model functions as a separate language, with unique bigram probabilities for generating words. A bigram probability represents the likelihood of a sequential relationship between two words; i.e., the probability that one word will follow another. For example, a bigram probability may be written as $$Pr(q_i=\text{Smith}|q_{i-1}=\text{Joe})P1. \tag{4}$$

This notation indicates that the probability of the word "Smith" following the word "Joe" is P1. In general, a bigram probability may be conditioned on a plurality of events being true. For example, the bigram probability shown above could have been written as $$Pr(q_i=\text{Smith}|q_{i-1}=\text{Joe, Person})=P2 \tag{5}$$

This notation indicates that the probability of the word "Smith" following the word "Joe" is P1, provided that the word Joe was part of the NC "Person". The use of such multiple conditioning criteria will be discussed in more detail later in this description.

Figure 3:
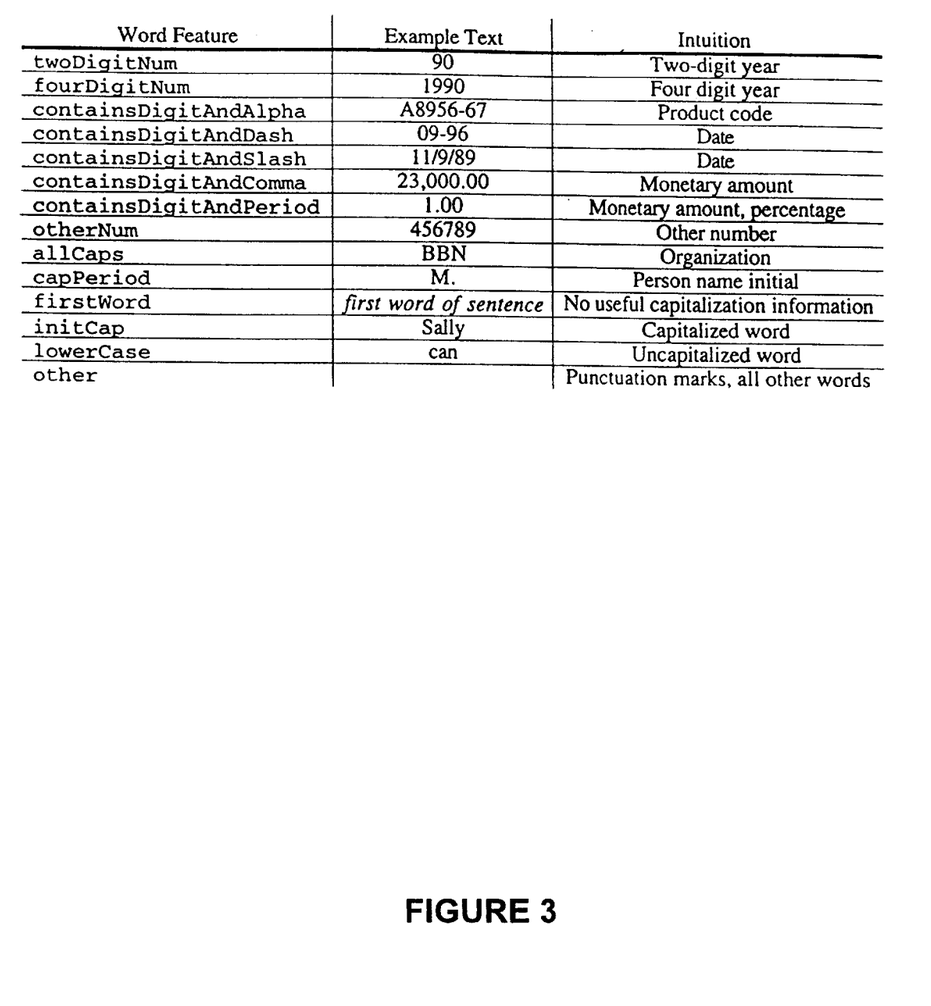
FIG. 3 shows a set of word features used in one embodiment of the present invention.

Each statistical bigram language model includes $V_j$ states, where $V_j$ is the vocabulary size for the $j^{th}$ NC state, and each of the $V_j$ states produces only one output symbol. Within the statistical bigram language model of the $j^{th}$ NC state, there are $|V_j|^2$ possible transitions, and therefore $|V_j|^2$ bigram probabilities. A two element output symbol vector, including a "word" element and a "word feature" element, is associated with each lower level state. The "word" element represents the raw text to be conveyed by the lower level state, and the "word feature" element represents an attribute which modifies the raw text in some manner. FIG. 3 shows a set of word features used in one embodiment of the present invention, although those skilled in the art will understand that other word features may be used to accomplish the same purpose.

It should also be appreciated that language model is not limited to bigram type. For example, other language models that can be used include unigram models, trigram models, etc.

Figure 4:
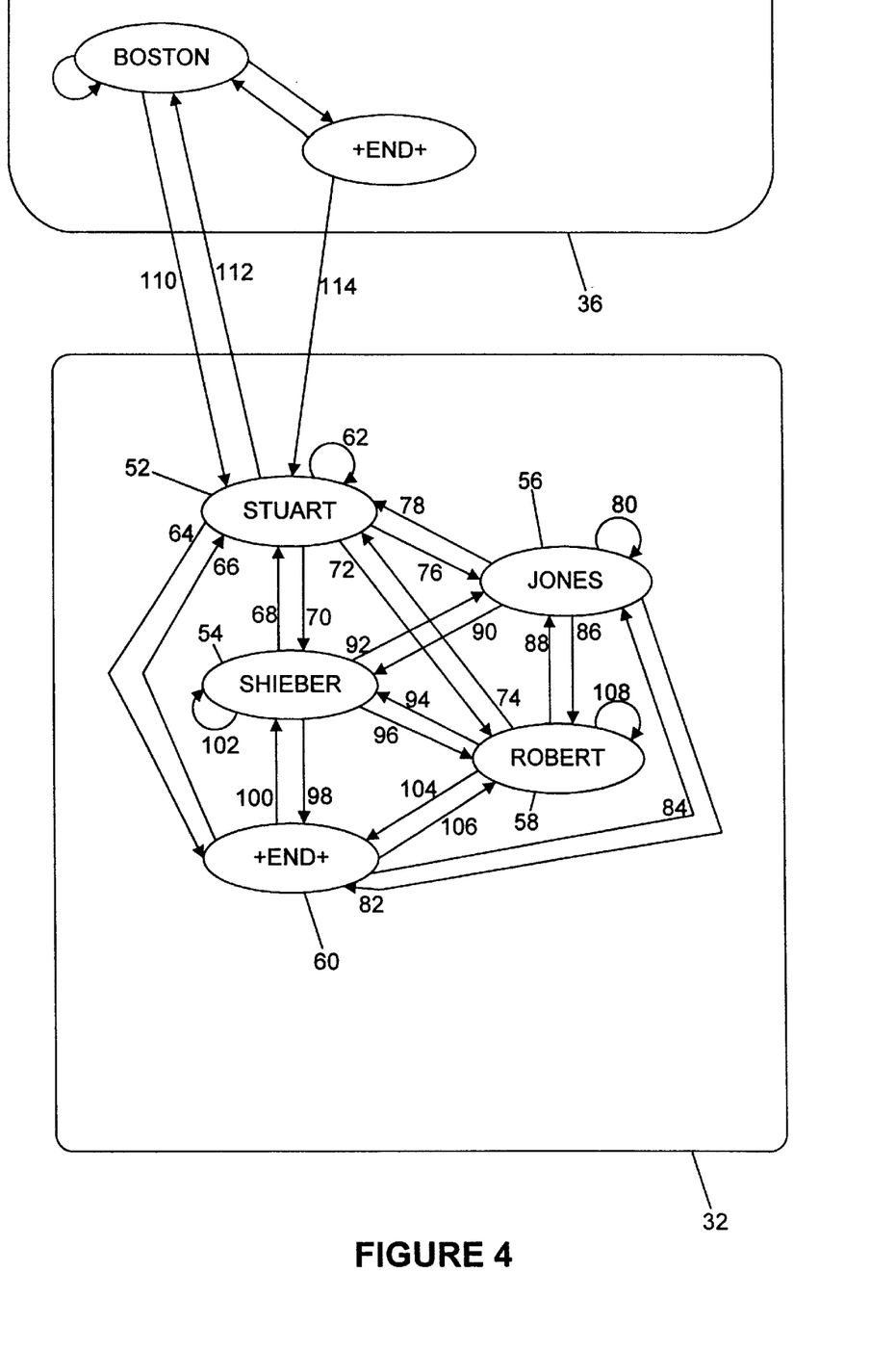
FIG. 4 shows a block diagram of an exemplary portion of the lower level model within the Person state of the present invention.

FIG. 4 shows a block diagram of an exemplary portion of the lower level model within the Person state 32. Five exemplary lower level states are shown: Stuart 52, Schieber 54, Jones 56, Robert 58 and +end+ 60. The +end+ 60 state is a special state included in each of the lower level models so that the HMM can determine the probability of any state being the final lower level state of its NC state. For simplicity, only the "word" portion of the two element output symbol vector is shown in each of the lower level states. State transitions, including transitions from a state to itself are shown via labels 62 through 108. In addition, a portion of the Location 36 NC state is shown in order to illustrate state transitions from one NC state to another. The lower level states Boston 118 and +end+ 116 are included for the Location 36 state. State transitions from one NC state to another are shown by transitions 110, 112 and 114.

In general, there are two types of transitions possible with the HMM described herein: a transition from one NC state to another NC state and a transition from one lower level state to another lower level state within the same NC state. The probability of a transition from one NC state to another NC state is represented by $$Pr(NC|NC_{-1}, w_{-1}) \cdot Pr((w,f)_{first}|NC, NC_{-1}), \tag{6}$$

where NC represents the current named-entity class, $NC_{-1}$ represents the previous name class, $w_{-1}$ represents the "word element" of the previous two element output symbol vector, and $(w,f)_{first}$ represents the first two element output symbol vector in a named-entity class. The rationale for factoring this probability expression into two parts is that a word preceding the start of a NC, (e.g., "Mr." or "President" or other titles preceding the Person NC) and the word following a NC would be strong indicators of the subsequent and preceding name-classes, respectively. The probability expression (6) is not conditioned on the "word feature" associated with $w_{-1}$ because in cases where the previous word would help the model predict the next NC, the word feature, capitalization in particular, is not important. For example, "Mr." is a good indicator that the next word will be a member of the Person NC, regardless of capitalization, and there is little additional benefit gained in distinguishing between "Mr." and "mr.".

The probability of a transition from one lower level state to another lower level state within a NC state is given by $$Pr((w,f)|(w,f)_{-1}, NC), \tag{7}$$

where (w,f) represents the current two element output symbol vector, $(w,f)_{-1}$ represents the previous two element output symbol vector and NC represents the current named-entity class.

The probability that any word in a NC is the final word of its NC is given by $$Pr((+end+,other)|(w,f)_{final}, NC), \tag{8}$$

where (+end+,other) represents the two element output symbol vector of the special end state, and $(w,f)_{final}$ represents the two element output symbol vector of the postulated final word. When equation (6) is used to determine the probability of a transition from one NC state to another NC state, the first factor of equation (6) is conditioned on the final real word of the previous NC rather than the +end+ state. The only exception to this rule is when the previous upper level state is the Start of Sentence 48 state. Consequently, the first factor of probability (6) can be written as $$Pr(NC|NC_{-1}, w_{-1}) \rightarrow \tag{9}$$
$$\begin{pmatrix} w_{-1} = +\text{end}+, \text{ if } NC_{-1} \text{ is Start-of-Sentence} \\ w_{-1} = \text{last observed word otherwise} \end{pmatrix}.$$

The supervised training element 12 compiles a database of vocabulary words, for each of the NCs used by the HMM, from the training text it receives at training input port 16. The supervised training element 12 then generates the statistical information represented by transitional probabilities (6) through (9) from the database. In one embodiment of the invention, the exemplary sentence, "IBM Corp. is located in New York.", could be labeled as follows in the training text:

<Corporate Name>: IBM Corp.
<Not-a-Name>: is located in
<Location Name>: New York., although those skilled in the art will recognize that other labeling methods could be used. For each training word received at training input port 16, the supervised training element 12 performs a simple, deterministic computation to generate one of the "word feature" elements listed in FIG. 3. The supervised training element 12 then compiles a two element output symbol vector corresponding to the training word, and adds the output symbol vector to the corresponding NC database.

The supervised training element 12 generates the statistical information represented by transitional probabilities (6) through (9) by using the vocabulary words in the NC databases in the following event-to-sample size ratio calculations:

$$\Pr(NC | NC_{-1}, w_{-1}) = \frac{c(NC, NC_{-1}, w_{-1})}{c(NC_{-1}, w_{-1})} \quad (10)$$

$$\Pr(\langle w, f \rangle_{first} | NC, NC_{-1}) = \frac{c(\langle w, f \rangle_{first}, NC, NC_{-1})}{c(NC, NC_{-1})} \quad (11)$$

$$\Pr(\langle w, f \rangle | \langle w, f \rangle_{-1}, NC) = \frac{c(\langle w, f \rangle, \langle w, f \rangle_{-1}, NC)}{c(\langle w, f \rangle_{-1}, NC)}, \quad (12)$$

where c( ) represents the number of times the event within the parenthesis occurred in the training text.

Figure 5:
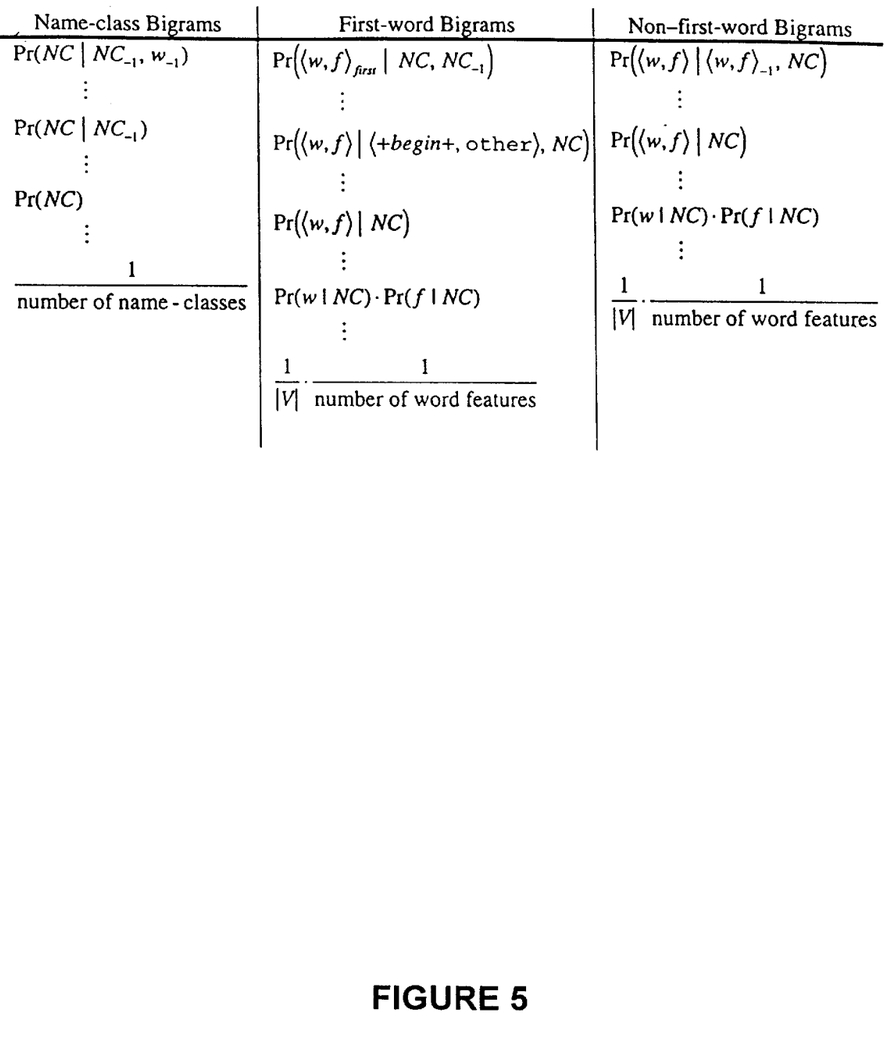
FIG. 5 shows the back-off models used by the present invention.

The probability calculations of equations (10), (11) and (12) provide statistical information related to word pairs in which both words are known. In some instances, the HMM receives word pairs in which one or both of the words have not been encountered in training. The invention accommodates such instances with "back-off" models generated by calculating probabilities which involve one or more unknown words, and are weighted relative to the probability calculations of equations (10), (11) and (12) to compensate for the reduced accuracy of the back-off model probabilities. FIG. 5 shows the back-off models used by the present invention various probabilities calculated by the supervised training element 12 as less and less information is available for the conditioning criteria.

In general, when the supervised training element 12 calculates Pr(X|Y), the probabilities of equations (10), (11) and (12) are weighted by $\lambda$, while the back-off models are weighted by $(1-\lambda)$, where $$\lambda = \left(1 - \frac{\text{old } c(Y)}{c(Y)}\right) \cdot \left(\frac{1}{1 + \frac{\text{unique outcomes of } Y}{c(Y)}}\right). \quad (13)$$

In equation (13), the term "old c(Y)" represents the sample size of the model from which we are backing off. The first factor on the right hand side of equation (13) is primarily included for cases in which the back-off model has roughly the same amount of training as the current model. To illustrate the use of equation (13), assume that the supervised training element 12 received the bigram "come hither" once during training, and the supervised training element 12 received the bigram "come here" three times during training. Also assume that the word "come" was never received except in the three aforementioned instances. When computing the primary probability Pr("hither"|"come", Not-a-Name), the supervised training element 12 would back off to the unigram probability of Pr("hither"|Not-a-Name). The weight $\lambda$ which the supervised training element 12 assigns to the primary probability, ignoring the first factor of equation (13), is $$\lambda = \left(\frac{1}{1 + \frac{2}{4}}\right) = \frac{2}{3}, \quad (14)$$

and the weight $(1-\lambda)$ which the supervised training element 12 assigns to the back-off probability is $$(1 - \lambda) = \left(1 - \frac{2}{3}\right) = \frac{1}{3}. \quad (15)$$

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A named-entity recognition system comprising:
   a multilevel hidden Markov model, said hidden Markov model including:
   (a) at least one upper level representing named entities; and
   (b) at least one lower level representing words generated by the upper level.

2. A named-entity recognition system according to claim 1, wherein the upper level includes a plurality of name classes, and said lower level includes a plurality of word states.

3. A named-entity recognition system according to claim 1, wherein said Markov model includes a first language model for assigning transition probabilities between the states of the upper level, and includes a second language model for assigning transition probabilities between the words of the lower level.

4. A named-entity recognition system according to claim 3, wherein said first language model is a bigram model, and said said second language model is a bigram model.

5. A named-entity recognition system according to claim 1, wherein at least one of the transitions between said upper levels is conditioned on the output of the previous lower states, and at least one of the transitions between the lower states is conditioned on the output of the previous upper state.

6. A named-entity recognition system comprising:
   a multilevel hidden Markov model, said hidden Markov model including:
   (a) at least one upper level including a first plurality of states of a predefined classification of named entities, and
   (b) at least one lower level including a second plurality of states of a predefined classification of words,
   wherein at least one of the transitions between the upper states is conditioned on the output of the previous lower states, and at least one of the transitions between the lower state is conditioned on the output of the previous upper state.

7. A named-entity recognition system according to claim 6, wherein said Markov model includes a first language model for assigning transition probabilities between the states of the upper level, and includes a second language model for assigning transition probabilities between the words of the lower level.

8. A named-entity recognition system according to claim 7, wherein said first language model is a bigram model, and said said second language model is a bigram model.

9. A computer-assisted method for recognizing and labeling instances of name classes in textual environments, comprising the following steps:

A. receiving a marked string of words and using said marked string to estimate a plurality of HMM parameters, and using said plurality of HMM parameters to generate an HMM having N states, each of said N states representing a name class and having a plurality of member states;

B. receiving an unmarked string of K words, K being an integer;

C. recognizing and labeling a plurality of name class instances in said unmarked string of K words, including the following substeps:

i. receiving a $k^{th}$ and a $(k+1)^{th}$ word from said unmarked string of K words;

ii. determining, from said HMM parameters, a transition probability representing a likelihood of said $(k+1)^{th}$ word being a member of an $i^{th}$ state, given said $k^{th}$ word being a member of a $j^{th}$ state, and given said $(k+1)^{th}$ word immediately following said $k^{th}$ word, said $i^{th}$ and $k^{th}$ states being member states of said N states;

iii. repeating step (ii) for all i from 1 to N and for all j from 1 to N, whereby $N^2$ transition probabilities are determined, and retaining the highest transition probability to the $(k+1)^{th}$ word in each of the N states;

iv. repeating steps (i), (ii) and (iii) for all k from 1 to K, whereby $N \cdot (K-1)$ transition probabilities are retained;

v. identifying a highest probability path from the $K^{th}$ word back to the first word; and,      vi. labeling each of said K words with said name class state through which said highest probability path from the N identified paths passes.

10. A method according to claim 9, wherein said HMM parameters include a plurality of bigram probabilities and a plurality of unigram probabilities, and said transitional probabilities are determined by selecting from said bigram probabilities and unigram probabilities, in a predetermined order, based upon said $k^{th}$ and said $(k+1)^{th}$ appearances in said marked string of words.

11. A method according to claim 9, wherein some of said transitional probabilities are conditioned upon said name class states, some of said transitional probabilities are conditioned upon said member states, and some of said transitional probabilities are conditioned upon both name class states and said member states.

12. A method according to claim 9, wherein said number of name class states N is 8.

13. A method according to claim 9, wherein each of said member states is representative of a single word.

14. A apparatus according to claim 9, wherein said HMM parameters include a plurality of bigram probabilities and a plurality of unigram probabilities, and said transitional probabilities are determined by selecting from said bigram probabilities and unigram probabilities, in a predetermined order, based upon said $k^{th}$ and said $(k+1)^{th}$ appearances in said marked string of words.

15. A apparatus according to claim 8, wherein some of said transitional probabilities are conditioned upon said name class states, some of said transitional probabilities are conditioned upon said member states, and some of said transitional probabilities are conditioned upon both name class states and said member states.

16. A computer system for recognizing and labeling instances of name classes in textual environments, comprising:

A. means for providing a marked string of words and using said marked string to estimate a plurality of HMM parameters, and using said plurality of HMM parameters to generate an HMM having N states, each of said N states representing a name class and having a plurality of member states;

B. means for receiving an unmarked string of K words, K being an integer;

C. means for recognizing and labeling a plurality of name class instances in said unmarked string of K words, including:

i. means for receiving a $k^{th}$ and a $(k+1)^{th}$ word from said unmarked string of K words;

ii. means for determining, from said HMM parameters, a transition probability representing a likelihood of said $(k+1)^{th}$ word being a member of an $i^{th}$ state, given said $k^{th}$ word being a member of a $j^{th}$ state, and given said $(k+1)^{th}$ word immediately following said $k^{th}$ word, said $i^{th}$ and $k^{th}$ states being member states of said N states;

iii. means for repeating step (ii) for all i from 1 to N and for all j from 1 to N, whereby $N^2$ transition probabilities are determined, and retaining the highest transition probability to the $(k+1)^{th}$ word in each of the N states;

iv. means for repeating steps (i), (ii) and (iii) for all k from 1 to K, whereby $N \cdot (K-1)$ transition probabilities are retained;

v. means for identifying a highest probability path from the $K^{th}$ word back to the first word; and,      vi. means for labeling each of said K words with said name class state through which said highest probability path from the N identified paths passes.

\* \* \* \* \*

UNITED STATES PATENT AND TRADEMARK OFFICE
CERTIFICATE OF CORRECTION

PATENT NO.   : 6,052,682
DATED        : April 18, 2000
INVENTOR(S)  : Scott Miller et al.

Page 1 of 1

It is certified that error appears in the above-identified patent and that said Letters Patent is hereby corrected as shown below:

<u>Column 1,</u>
Prior to the line 11, BACKGROUND OF THE INVENTION", please enter the following:
-- STATEMENT REGARDING FEDERALLY SPONSORED RESEARCH OR DEVELOPMENT This invention was made with Government support under Contract No.F30602-95-C-0111, awarded by U.S. Air Force. The Government has certain rights in this invention. --

Signed and Sealed this

Twenty-second Day of January, 2002

Attest:

JAMES E. ROGAN
*Attesting Officer*   *Director of the United States Patent and Trademark Office*